Dec. 14, 1965 W. DELLITH 3,222,744
PANEL FASTENER
Filed July 26, 1963
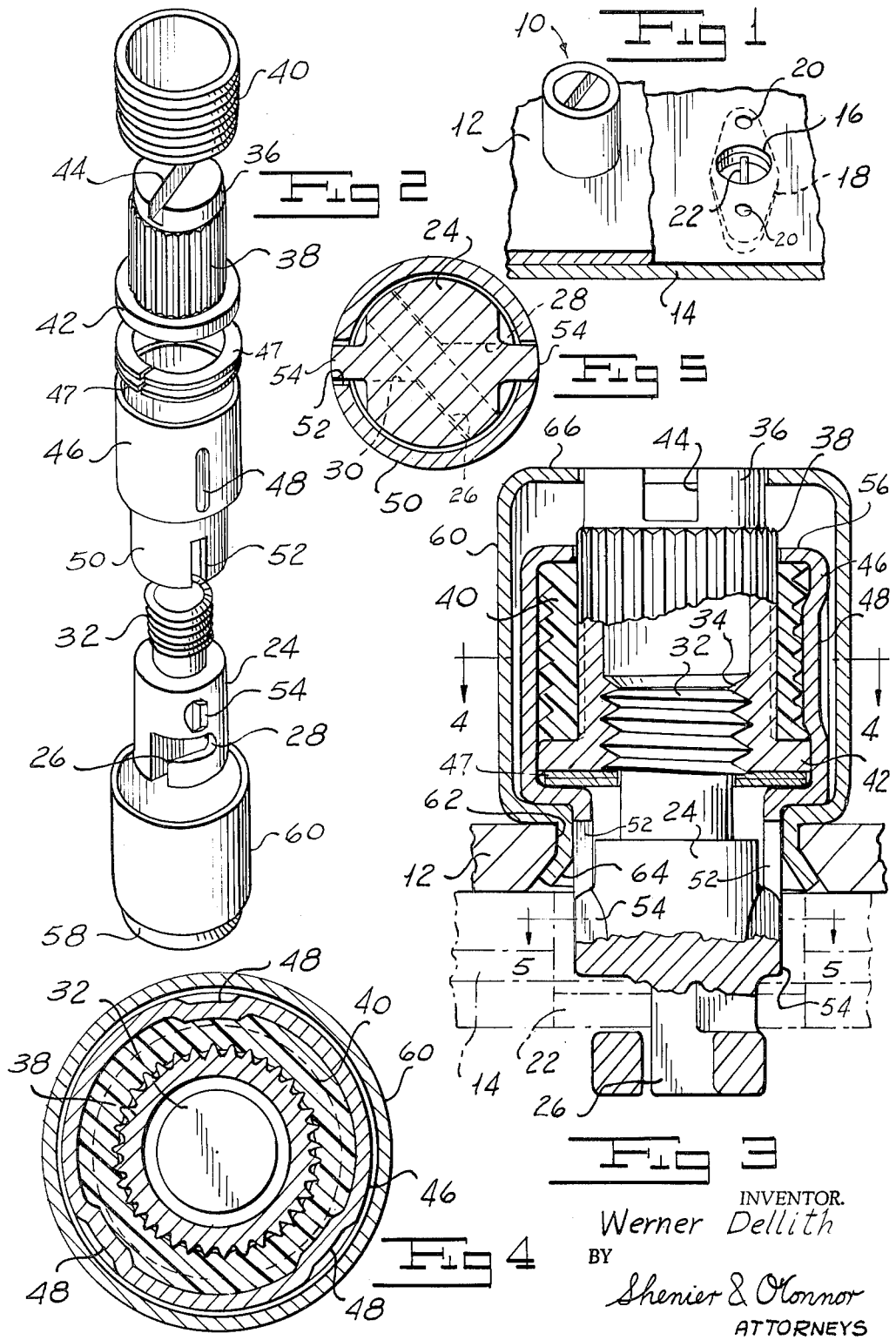
INVENTOR.
Werner Dellith
BY
Shenier & O'Connor
ATTORNEYS 3,222,744
PANEL FASTENER
Werner Dellith, Ringwood, N.J., assignor to Camloc Fastener Corporation, Paramus, N.J., a corporation of New York
Filed July 26, 1963, Ser. No. 297,909
9 Claims. (Cl. 24—221)

My invention relates to a panel fastener and more particularly to an improved panel fastener which is adapted to support a relatively large load and which can withstand relatively severe vibration without disengaging.

There are known in the prior art fastening devices which are used to mount components and instruments on panels such, for example, as in aircraft. One form of this type of fastener includes a receptacle formed with an opening and provided with a relatively stiff wire adapted to be engaged by the fastener. The fastener itself comprises a stud provided with a slot leading into a track formed with a seat adapted to receive the receptacle wire.

In use of the fastener described above the stud is moved to cause the slot to slip over the wire and is then rotated so that the track guides the wire into the seat. In order to prevent the fastener from working loose under the action of vibration it is provided with a spring which urges the seat of the stud into engagement with the receptacle wire.

This fastener has proved satisfactory for relatively light instruments and assemblies which are not subject to severe vibration. With the advancing tide of progress the units to be mounted require more and more components and instruments until they have become so heavy that the spring-loaded fasteners of the prior art do not satisfactorily support the units. That is, under such heavy loads the danger exists that the fastener may work loose and release the assembly with consequent damage to the installation.

I have invented an improved panel fastener which is adapted to be used with the same receptacle as that employed in connection with the spring-loaded fasteners of the prior art. My improved panel fastener is able to support a much greater load without disengaging than will a spring-loaded fastener of the type known in the prior art. My fastener can withstand severe vibration without accidentally disengaging. While my fastener provides a high holding force it is readily releasable.

One object of my invention is to provide an improved panel fastener which is releasable and yet can support a relatively heavy load.

Another object of my invention is to provide a panel fastener which can withstand severe vibration without accidentally disengaging.

Still another object of my invention is to provide an improved panel fastener which can be used with receptacles of the type known in the prior art.

A further object of my invention is to provide an improved panel fastener which is small and compact for the high holding force provided thereby.

Other and further objects of my invention will appear from the following description.

In general my invention contemplates the provision of a panel fastener in which an actuator is threadably connected to a stud adapted to engage a receptacle upon limited rotary movement of the stud. As the stud moves into engagement with the receptacle, a housing connected to the actuator by a friction coupling moves into locking engagement with the receptacle. Further rotation of the actuator relative to the housing against the action of the friction coupling draws the receptacle toward the fastener.

In the accompanying drawings which form part of the instant specification and which are to be read in conjunction therewith and in which like reference numerals are used to indicate like parts in the various views:

FIGURE 1 is a fragmentary perspective view of my improved fastener and of a receptacle adapted to be engaged thereby.

FIGURE 2 is an exploded perspective view of the various parts which make up my improved panel fastener.

FIGURE 3 is a sectional view of my improved panel fastener.

FIGURE 4 is a sectional view of my improved panel fastener taken along the line 4—4 of FIGURE 3.

FIGURE 5 is a sectional view of my improved panel fastener taken along the line 5—5 of FIGURE 3.

Referring now to the drawings, my improved fastener indicated generally by the reference character 10 may be employed to secure a member 12 comprising part of an instrument assembly or the like to a member 14 comprising a part of the panel or the like on which the assembly is to be mounted. In the prior art the member 14 is provided with a plurality of openings 16 which register with openings in receptacle plates 18 secured to the member 14 by any suitable means such as by rivets 20. Each plate 18 has secured thereto in any suitable manner known to the art a length of stiff wire 22 which extends across the opening 16. As will be described hereinafter, my fastener is adapted to engage the wire 22 to hold the members 12 and 14 in assembled relationship.

My fastener includes a movable fastener element or stud 24, the lower end of which has a slot 26 extending in the direction of the axis of the stud. I form a pair of lateral extensions 28 and 30 at the inner end of the slot 26. It will readily be appreciated that if the stud 24 is moved into the opening 16 so as to permit the wire 22 to move into the slot 26 when the wire engages the inner end of the slot the stud can be turned through about a quarter of a turn to cause the wire 22 to move into the extensions 28 and 30 until it abuts the ends thereof.

I provide the stud 24 with a threaded portion 32 of reduced diameter. The reduced threaded portion 32 is adapted to engage threads 34 formed in the hollow interior of the fastener nut 36. The outer surface of nut 36 is provided with serrations 38. I assemble a friction bushing 40 on the serrations 38 with a force fit until the bushing 40 rests on a flange 42 of the nut 36. A slot 44 in the nut is adapted to be engaged by a suitable tool such as a screwdriver to permit the nut to be turned. It will readily be appreciated that the nut 36 is the actuator of my fastener.

My fastener includes an inner housing 46 having longitudinally extending detents 48 adapted to be frictionally engaged with the bushing 40 in a manner to be described. A reduced diameter portion 50 of the housing 46 has a pair of slots 52 adapted to be engaged by guide lugs 54 on the stud 24. In assembling the parts of my fastener thus far described I first force the bushing 40 over the nut 36 until it engages the flanges 42. The serrations 38 hold the bushing 40 on the nut so as to prevent relative rotation therebetween. Next, I insert the stud 24 into the inner housing 46 through the open lower end of the reduced portion 50. I place two slit rings 47 within the larger end of housing 46 and screw them over the threaded end 32 of stud 24 until the undercut portion of the stud is below the threads as shown in FIGURE 3. I press the assembly of nut 36 and bushing 40 into the housing 46 and screw it onto the stud 24. When this has been done, I turn the upper edge of the housing 46 to form the flange 56. I form the bushing 40 with external annular fins which frictionally engage the detents 48 in the wall of housing 46. Owing to this frictional engagement and since the serrations 38 on the nut 36 prevent relative rotation between the nut and the busing 40, bushing 40 provides a friction coupling between the nut 36 and the housing 46. This friction coupling prevents such rotation of the nut in response to vibration as would permit the fastener accidentally to open.

When the operations described above have been performed, I insert the reduced diameter portion 58 of the outer housing 60 into an opening 62 in the member 12 which is to carry my fastener assembly 10. The outer housing 60 forms a support for the nut elements of the fastener. I upset the lower end of the portion 58 of housing 60 to form a flange 64 disposed in the countersunk portion of the hole 62 to retain the outer housing in position on the member 12. Next I take the subassembly of the stud 24, housing 46, slit rings 47, the nut 36 and the bushing 40 and insert it through the upper end of the outer housing 60 and turn the upper edge of the housing 60 inwardly to form a retaining flange 66 which prevents the inner housing from moving out of the outer housing. It will be appreciated that the inner housing 46 and the subassembly of the lug 24, nut 36 and bushing 40 is permitted to move freely relative to the outer housing 60 for a limited distance in the direction of the axis of the stud 24.

In use of my improved panel fastener to secure the member 12 to a member 14, for example, I first move the member 12 to a position at which the studs 24 of the fastener 10 carried by member 12 are aligned with the opening 16 across which the receptacle wires 22 extend. The nut 36 is rotated by means of a suitable tool such as a screwdriver first to align the slot 26 of the stud 24 with the wire 22. When this has been done, the nut 36 and stud 24 are moved axially until the wire 22 is positioned adjacent the lateral slot extensions 28 and 30. Now the assembly is turned in a clockwise direction until the ends of the slot extensions 28 and 30 are in engagement with the wire 22. At the same time wire 22 rides into the lower ends of slots 52 to lock housing 46 against rotation in either direction.

Next the nut 36 is turned further in a clockwise direction. Owing to the fact that the wire 22 is in engagement with the ends of the slot extensions 28 and 30, the stud 24 can no longer turn with the nut. As the nut 36 is rotated further bushing 40 moves with it owing to the fact that housing 46 is locked and the stud 24 is drawn upwardly as viewed in FIGURE 3 to clamp parts 12 and 14 firmly together. Ultimately, the wire 22 engages the slots 52 and the parts are securely held together. In this relative position of the parts, the frictional force between the lands of the bushing 40 and the indentations 48 of the housing 46 prevent any vibration to which the assembly is subjected from working the parts loose.

When the fastener is to be released, nut 36 is rotated in a counterclockwise direction as viewed from the top to turn bushing 40 relative to housing 46. In response to this operation stud 24 backs off and ultimately the stud and the receptacle move to such relative position that wire 22 is out of the ends of slots 52 to permit the housing 46 to turn with the nut so that the stud 24 also turns with the nut until wire 22 is released.

It will be seen that I have accomplished the objects of my invention. I have provided an improved panel fastener which is releasable and which will support a relatively heavy load. My fastener is capable of withstanding severe vibration without working loose. My fastener is adapted to be used in combination with receptacles of a type known in the prior art. My fastener is extremely small and compact with a high folding force afforded thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a fastening device for use with a stationary engageable element, an outer housing, an inner housing formed with means for engaging said element to lock said inner housing against rotary movement, means mounting said inner housing for rotary and axial movement on said outer housing, a bushing in frictional engagement with said inner housing, a nut, means for securing said nut to said bushing for rotation therewith, a stud in threaded engagement with the nut, means carried by said stud for engaging said stationary element in one rotary position and being free from engagement in another rotary position and means carried by said stud for engaging said inner housing to prevent rotation of said housing relative to said stud.

2. A fastening device for joining a first member to a second member provided with an engageable stationary cross pin including in combination an outer housing carried by said first member, an inner housing carried by said outer housing for rotary movement relative thereto, a bushing in frictional engagement with said inner housing, a nut carried by said bushing for rotation therewith and a stud threadably engaged with said nut, said stud provided with means for engaging said stationary element, said inner housing having means for engaging said stationary element after said stud has engaged said engageable element.

3. A fastening device for joining a first member to a second member provided with an engageable stationary cross pin including in combination a stud having an axial slot for receiving said cross pin, said stud having transverse extensions of said axial slot into which said cross pin is adapted to ride upon rotation of said stud, a nut threadably engaged with said stud, a housing, a friction bushing carried by said nut, said bushing being disposed in said housing and frictionally engaged therewith, said housing having an extension provided with slots, said extension slots adapted to receive said cross pin to lock said housing against rotary movement lugs on said stud adapted to ride in said slots and means for rotatably mounting said housing on said first member.

4. In a fastening device for joining a first member to a second member provided with an engageable stationary element, a movable fastener adapted to engage said element, a nut threadably engaged with said movable fastener to form an assembly, a support, a friction bushing disposed between said nut and said support for mounting said assembly on said support and means providing a coupling freely rotatably mounting said support on said first member.

5. In a fastening device for joining a first member to a second member provided with an engageable receptacle, a support, a movable fastener element adapted to engage said receptacle, an actuator for said movable element, means comprising a friction coupling for mounting said actuator on said support, means for mounting said support for rotary movement on said first member, means mounting said movable element on said actuator for rotary movement therewith into engagement with said stationary element and for axial movement relative thereto after said engagement, means for restraining said support and said movable element against relative rotation, and means on said support for engaging said receptacle to lock said support against rotary movement after the engagement of said movable element with said stationary element whereby continued rotary movement of said actuator against the action of said coupling draws said members together.

6. In a fastening device for joining a first member to a second member provided with a stationary engageable element, a support, a movable fastener element adapted to engage said receptacle, an actuator for said fastener, means comprising a friction coupling for mounting said actuator on said support, means for mounting said support for rotary movement on said first member, means mounting said movable element on said actuator for rotary movement therewith into engagement with said stationary element and for axial movement relative thereto after said engagement, and means for locking said support against rotary movement after engagement of said movable element with said stationary element whereby continued rotation of said actuator against the action of said friction coupling moves said movable element to draw said members together.

7. In a fastening device for joining a first member to a second member provided with an engageable stationary element, a support, a movable fastener element interengageable with said receptacle, an actuator for said movable element, means comprising a friction coupling for mounting said actuator on said support, means for mounting said support for rotary movement on said first member, and means mounting said movable element on said actuator for rotary movement therewith into engagement with said stationary element and for axial movement relative thereto after said engagement.

8. In a fastening device for use with a receptacle having a stationary engageable element including in combination a support, a movable fastener element interengageable with said stationary element, an actuator for said movable element, threaded interconnecting means between said movable element and said actuator to form an assembly, and means comprising a friction coupling for mounting said assembly on said support.

9. In a fastening device for use with a receptacle having a stationary engageable element, a support, a movable fastener element interengageable with said stationary element, an actuator for said movable element, means for operatively assembly said movable element and said actuator and means comprising a friction coupling for mounting said operative assembly on said support.

References Cited by the Examiner
UNITED STATES PATENTS

| | | | |
|---|---|---|---|
| 2,318,123 | 5/1943 | Segal | 24—221.2 |
| 2,374,679 | 5/1945 | Hallock | 24—221.2 |
| 2,581,089 | 1/1952 | Evans | 24—221.2 |
| 2,887,753 | 5/1959 | Ralph | 24—221.2 |
| 2,896,684 | 7/1959 | Zahodiakin | 151—69 |
| 2,936,501 | 5/1960 | Koch | 24—221.2 |
| 3,015,870 | 1/1962 | Ely | 24—221.2 |

DONLEY J. STOCKING, *Primary Examiner.*

BERNARD A. GELAK, *Examiner.*